United States Patent [19]

Rabow

[11] 4,209,834
[45] Jun. 24, 1980

[54] STATE VARIANT CORRELATOR

[75] Inventor: Gerald Rabow, Nutley, N.J.

[73] Assignee: International Telephone and Telegraph Corporation, New York, N.Y.

[21] Appl. No.: 770,681

[22] Filed: Oct. 25, 1968

[51] Int. Cl.² ............................................. G06F 15/34
[52] U.S. Cl. ..................................... 364/604; 364/728; 375/12
[58] Field of Search .................. 235/181; 325/65, 473; 364/604

Primary Examiner—Howard A. Birmiel
Attorney, Agent, or Firm—John T. O'Halloran; Alfred C. Hill

[57] ABSTRACT

The correlator responds to an input of N code sequences each having E code elements, each N sequence corresponding to a given state of a local coder. Each E element consists of one of W frequencies received for a time T. In the absence of an input an N-counter will advance under control of a timer. When the N-counter advances, an E-counter is reset. A local frequency synthesizer is set to one of W frequencies under control of the state of the coder, state of the E-counter and the state of the N-counter which will make the correlator receptive to the first element of the N-sequence corresponding to the value N at which the N-counter is sitting. If this frequency input is present for a time T, the E-counter will advance by one count and wait for the next element. The E-counter produces an output when advanced through E counts in a time interval to ET. This output advances the coder and delivers a correlator output corresponding to the state of the N-counter.

10 Claims, 4 Drawing Figures

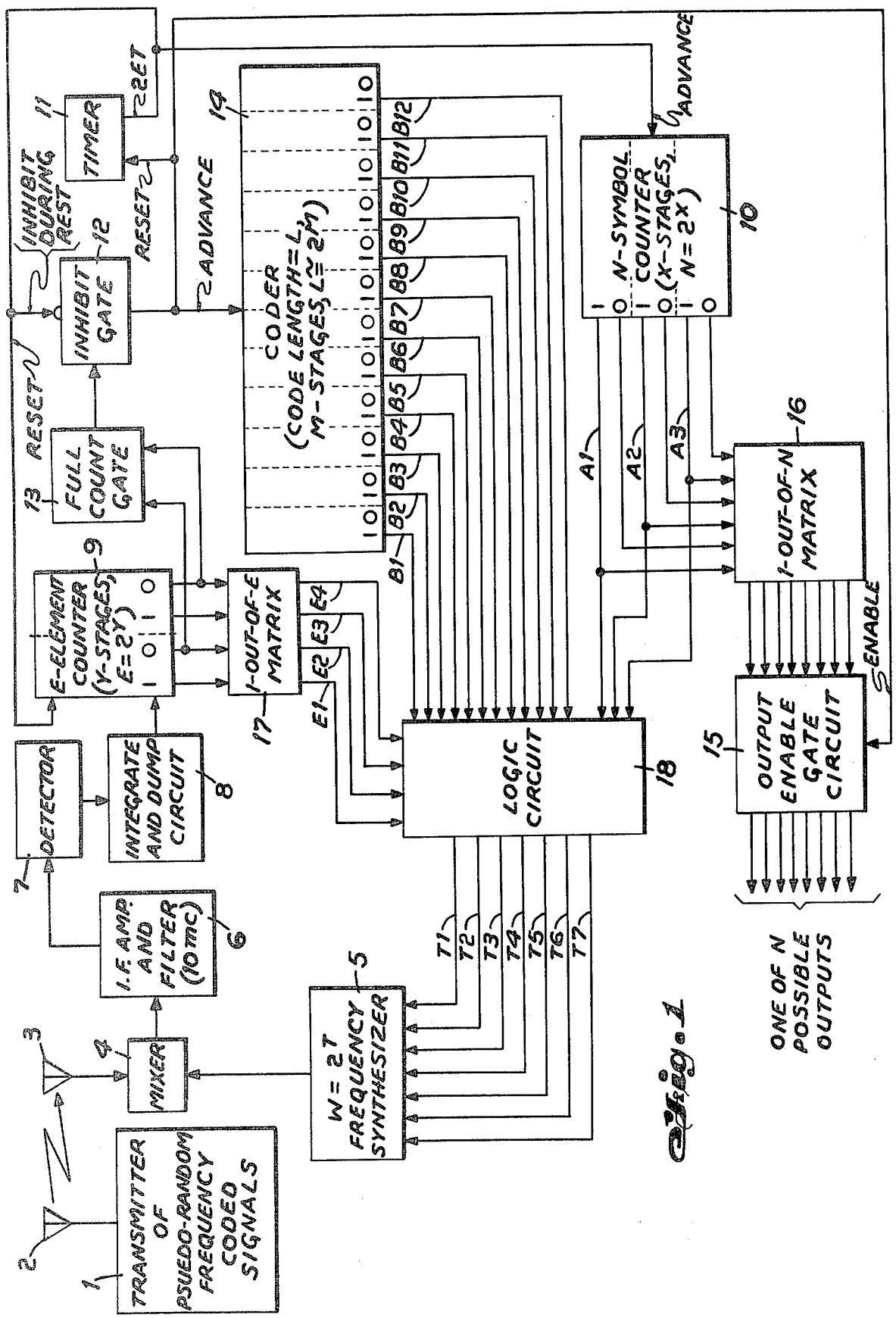

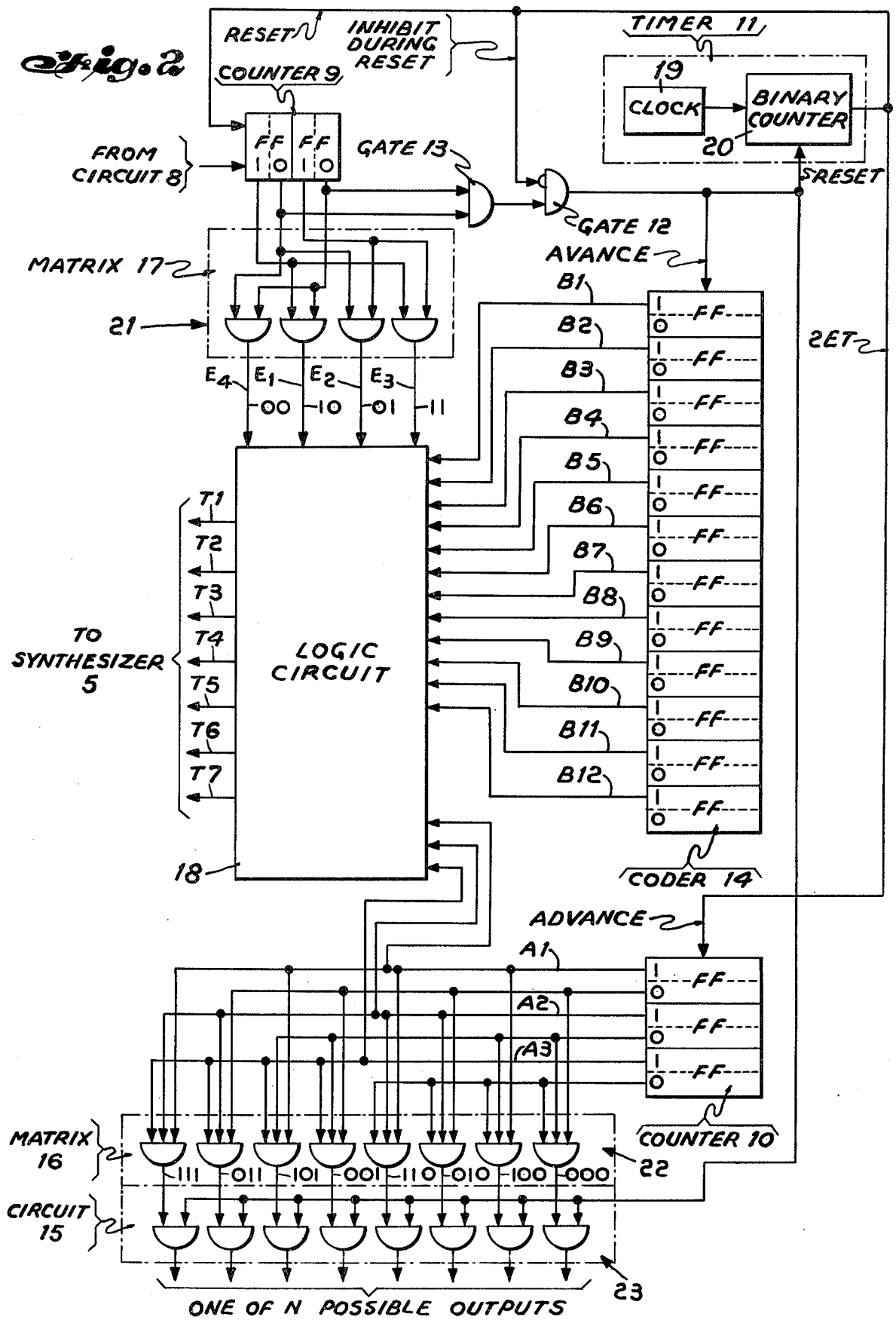

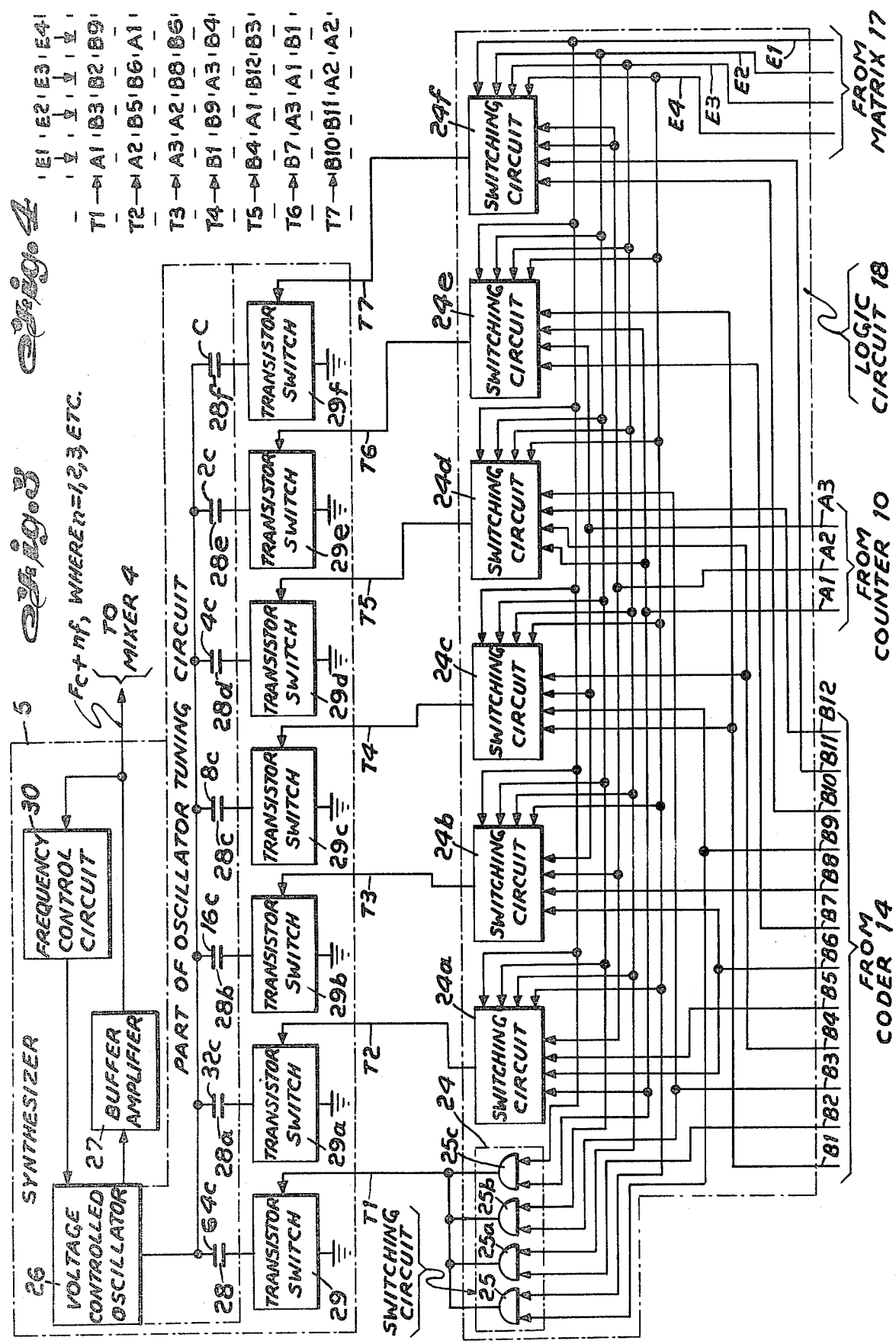

STATE VARIANT CORRELATOR

BACKGROUND OF THE INVENTION

This invention relates to communication systems having immunity to interferring signals and more particularly to a correlation type detector employed in the receiver of such communication systems.

It is desirable in communication systems employed in various applications, such as providing command signals to a satellite or other similar command systems, to provide immunity to interferring signals so that the commands are not lost or interrupted. The interferring signal immunity is enhanced by the type of detector employed in the receiver of the communication system.

A first type of detector that may be employed in this type of communication system is classified as an invariant matched filter or correlator. This type of correlator will not respond to signals $S_o$ but will respond to signals $S_i$, where i=1,2 ... n, where each signal $S_i$ is interpreted as a particular transmitted symbol. The properties required of $S_i$ are that they are sufficiently dissimilar so that an interferring signal will not be likely to change one signal $S_i$ and to another. Further signals $S_i$ must be a small class of signals compared to the class of signals represented by $S_o$ and the $S_o$ signals must represent a sufficiently large class. An implementation of this type of detector can be the same as the correlator of this invention wherein the coder is eliminated and replaced by a constant code state.

A second type of detector which may be employed in such communication systems is a time variant matched filter or correlator. Phase reversal coding and frequency hopping are special cases of time variant correlator and time variant matched filter, respectively. The major problems with this type of detector are reliable means of synchronization, rapid and reliable acquisition and reacquisition of synchronization, stable memory circuits, and high processing rates compared to information rates. This type of detector requires that both the transmitter and detector coder run at all times which increases the possibility of coder jump, thereby, reducing system reliability.

SUMMARY OF THE INVENTION

An object of the present invention is to provide still another type of correlator which has certain advantages over the above-mentioned prior art types of correlators.

Still another object of this invention is to provide a state variant correlator which overcomes the disadvantages mentioned hereinabove with respect to the prior art types of correlators.

Still another object of the present invention is to provide a state variant correlator having better security and interferring signal immunity than the invariant correlator and which is more reliable than the time variant correlator.

A feature of this invention is the provision of a state variant correlator comprising a source of code signals including a plurality of code sequences each having E-elements, where E is an integer greater than one, each of the elements being represented by one of a first plurality of different frequencies according to a given code; first means to generate a code identical to the given code; second means to generate a second plurality of different frequencies; third means to generate timing pulses defining a given time interval between adjacent ones of the timing pulses; first counter means coupled to the third means responsive to the timing pulses to produce N-code symbols, where N is an integer greater than one; second counter to count the E-elements of each of the code sequences; fourth means coupled to the first and second counter means and the first means responsive to a full count of the second counter means to change the state of the first means and to read-out the state of the first counter means to produce an output signal for the correlator; fifth means coupled to the first means, the first and second counter means and the second means responsive to the state of the first means and said first and second counter means to select the output frequencies of the second means from the second plurality of frequencies to provide second sequences of frequencies, each of the frequencies of each of said second sequences being in a predetermined frequency relation with the frequencies representing the corresponding one of the E-elements of each of the code sequences; and sixth means coupled to the source, the second means and the second counter means to detect each of the E-elements of each of the code sequences and to activate the second counter means with the detected E-elements.

BRIEF DESCRIPTION OF THE DRAWING

The above-mentioned and other features and objects of this invention will become more apparent by reference to the following description taken in conjunction with the accompanying drawings, in which:

FIG. 1 is a block diagram illustrating the state variant correlator in accordance with the principles of this invention;

FIGS. 2 and 3 illustrate in greater detail the components contained in certain of the blocks of the correlator of FIG. 1; and FIG. 4 illustrates a matrix useful in determining the connections to the switching circuits of the logic circuit of FIGS. 1, 2 and 3.

DESCRIPTION OF THE PREFERRED EMBODIMENT

Referring to FIG. 1, there is illustrated therein in block diagram form a communication system having immunity to interferring signals incorporating the state variant correlator in accordance with the principles of this invention. Transmitter 1 provides N code sequences of length E, where E is an integer greater than one equal to the number of code elements in each of the N code sequences. Each element of the code sequences consist of a tone of one of W frequencies transmitted for a time T. This transmitted signal is obtained in transmitter 1 by employing a coder which in the case of a pseudo-random code signal may include a shift register type coder with appropriate feedback between the stages thereof to provide the desired pseudo-random code signal. The output of the transmitter coder operates upon a frequency synthesizer to provide the desired frequency for each E element of each of the N sequences transmitted by the transmitter. Each sequence will be repeated 2KN times by transmitter 1, where K is equal to or greater than one.

The code sequences from transmitter 1 are propagated by antenna 2 to antenna 3 of the receiver and, hence, to mixer 4. The properly selected frequency from frequency synthesizer 5 is coupled to mixer 4 so that a predetermined frequency difference exists between the frequency representing the received element and the frequency at the output of synthesizer 5 so that the resultant output of mixer 4 will pass through the IF (intermediate frequency) amplifier and filter 6 for detection in detector 7. For instance, if the frequency representing one element is 150 megacycles, the frequency output of synthesizer 5 would be selected to be 140 megacycles resulting in a difference output from mixer 4 of 10 megacycles which then can pass through amplifier and filter 6 to detector 7. The output of detector 7 is then coupled to integrate and dump circuit 8 which will be determined whether the frequency representing a single element of an N sequence is received for the time T. Circuit 8 would include a capacitor which is charged up to a selected value over the time T. After the time T the voltage stored in this capacitor will be quickly discharged or "dumped" so as to trigger E-element counter 9 to indicate that an element of a transmitted N sequence has been received.

In the absence of any input from transmitter 1, N-symbol counter 10 will be advanced at a rate of one count every 2ET time intervals as controlled by timer 11. Whenever counter 10 is advanced, counter 9 is reset by the output of timer 11 which output also is applied to INHIBIT gate 12 to prevent an output from counter 9 when reset which is the same as a full count. In the absence of an input nothing further happens during the 2ET interval. The frequency synthesizer 5 is set to one of W frequencies which will make filter 6 receptive to the first element of the received N sequence corresponding to the value of N at which counter 10 is sitting. If this frequency is received for an interval T, integrate and dump circuit 8 will advance counter 9 by one and clear to wait another output from detector 7. Counter 9 will produce an output if and only if it is advanced through E steps within the 2ET interval by full count gate 13. It should be noted that the presence of the transmitted sequence described above assures this, even if additional spurious inputs of the right or wrong frequency are present. Counter 9 in cooperation with gate 13 advances coder 14 to its next state and also delivers an enable output to output enable gate circuit 15 to provide the correlator output corresponding to the state of the N counter. The state of counter 10 is detemined by the 1-out-of-N matrix 16.

The state of counter 9 is determined by 1-out-of-E matrix 17 and the output of matrix 17 in conjunction with the state of coder 14 and the state of counter 10 controls logic circuit 18 so as to provide outputs on terminals T1-T7 of synthesizer 5. The output from logic circuit 18 is binary in nature, in other words, there will be a binary 1 or a binary 0 on each of the terminals T1-T7 which in combination will be utilized to select the proper frequency for the output signal of synthesizer 5 to enable the detection of the received element frequency in mixer 4, filter 6, detector 7 and circuit 8.

For purposes of explanation, certain values for E, M, N, and W have been assumed merely for purposes of explanation and it is obvious that other values can be selected for these letters to fulfill the requirement of the communication system to provide the desired immunity from interferring signals. In the example illustrated, $E=4$ and is provided by $Y=2$ binary devices, or flip-flop stages. Coder 14 has $M=12$ binary devices, or flip-flop stages which provides $L \cong 2^{12}$ states. Counter 10 has $X=3$ bistable devices, or flip-flop stages which provides $N=8$ ($2^3$) code symbols or states. Since seven input terminals are provided from logic circuit 18 for synthesizer 5, the value of $W=2^7=128$ different frequencies. The selection of these different frequencies by the binary conditions on terminal T1-T7 will be more fully described with reference to FIG. 3 hereinbelow.

Referring to FIG. 2, there is illustrated therein in block diagram form, the components of certain of the circuits of FIG. 1 in accordance with the above example. Counter 9 coupled to circuit 8 includes two flip-flops who have the 0 outputs thereof coupled to gate 13 illustrated to be an AND gate to indicate a full count and deliver an output when a full count is present. This full count output of the gate 13 is coupled to INHIBIT 12 whose operation is inhibited by the output of timer 11 during reset of counter 9 to prevent a false full count output upon reset of counter 9. Timer 11 includes a highly stable clock 19 and binary counter 20 to provide the timing pulses having a time interval 2ET between adjacent timing pulses. As pointed out hereinabove, the output of counter 20 is employed to reset counter 9, inhibit INHIBIT 12 and to advance the state of counter 10. Also as pointed out hereinabove, the output of gate 12 when counter 9 has achieved full count advances the state of coder 14 which according to the example employed herein includes twelve flip-flop stages interconnected in a predetermined manner to provide a code identical to the coder of transmitter 1 but not precisely synchronized therewith since it is only the state of the coder that is important in the operation of this invention and not the precise synchronization between the drive pulses to the coder. In addition, the output of gate 12 is coupled to counter 20 of timer 11 as a reset therefore. This connection is also shown in FIG. 1. The purpose of this reset connection from the output of gate 12 is to reset counter 20 should counter 9 count all the code elements E of one of the N sequences prior to the end of the time interval 2ET. Thus, the time interval as controlled by timer 11 is advanced and the operation of the correlator is sped up, since it is not necessary to wait to the end of the normal time interval 2ET once the full count of the E elements has been detected.

The matrix 17 is illustrated as including four AND gates 21 whose output E1-E4 control logic circuit 18. Logic circuit 18 is also controlled by the 1 outputs of each stage of coder 14 identified as B1-B12.

Counter 10 is illustrated as including three flip-flop stages having their 1 and 0 outputs coupled to 1-out-of-N matrix including eight AND gates 22 in the example being considered. The binary state of counter 10 is represented at the output of each of the AND gates 22 which is coupled to output enable gate circuit 15 including eight AND gates 23 coupled to the outputs of AND gates 22 as illustrated and enabled by the output of gate 12 to provide one-out-of-$N=8$ possible outputs as the output for the correlator of this invention. The 1 outputs of each stage of counter 10 is also utilized to control logic circuit 18 and are labeled A1-A3.

The E1-E4 inputs, B1-B12 inputs and A1-A3 inputs to logic circuit 18 cooperate through appropriate logic switching circuits to connect the B1-B12 and A1-A3 outputs from coder 14 and counter 10 to the appropriate output terminals T1-T7 to provide binary outputs on terminals T1-T7 to control the selection of the frequency output from synthesizer 5.

A typical logic matrix is shown in FIG. 4 to enable appropriate connections to the switching circuits of logic circuit 18. When counter 9 provides an E1 output, column 1 of the matrix is connected to all the terminals T1-T7 so that the binary conditions of the inputs illustrated from coder 14 and counter 10 will be connected to the appropriately indicated terminals T. When counter 9 provides an E2 output, column 2 inputs from coder 14 and counter 10 are connected to the terminals T1-T7. When counter 9 provides E3 output, column 3 inputs from coder 14 and counter 10 are coupled to terminals T1-T7. When counter 9 provides an E4 output the inputs from coder 14 and counter 10 illustrated in the fourth column are coupled to terminals T1-T7.

Referring to FIG. 3, there is illustrated therein logic circuit 18 in greater detail including switching circuits 24 coupled to the inputs of coder 14, counter 10 and counter 9 according to the exemplary logic matrix of FIG. 4. Switching circuit 24 includes four AND gates, such as AND gates 25 to 25C appropriately connected to the various inputs to logic circuit 18 as clearly illustrated in the diagram. As pointed out hereinabove, there will be binary signals on each of the terminals T1-T7 depending upon which of the switching circuits 24 are activated by the output from counter 9 and the binary state of the outputs from coder 14 and counter 10. The outputs T1-T7 including the binary state of the inputs from coder 14 and counter 10 coupled to the activated switching circuit 24 are applied to synthesizer 5 which is shown to include a voltage controlled oscillator 26 and a buffer amplifier 27 which provides an output to mixer 4 equal to Fc+nf, where n equals 1, 2, 3 and etc., where 1 is the fundamental frequency of oscillator 26 and 2, 3 and etc. are harmonics thereof as provided by the capacitors 28 which are weighted as indicated and placed in the tuning circuit of oscillator 26 by activation of transistor switches 29 in accordance with the binary conditions applied through corresponding terminal T1-T7 coupled from switches 24. The output of amplifier 27 is also coupled to a frequency controlled circuit 30 to control the frequency of oscillator 26 so as to remove any frequency drift therefrom. Details of synthesizer 5, modified as illustrated in FIG. 3, are clearly disclosed in the copending application of J. Kadin et al, Ser. No. 737,417, filed June 17, 1968.

It should be noted that the correlator described hereinabove is very resistant to an anomalous behavior. Assuming that coder 14 has been erroneously advanced by one due to an interferring signal. The next bona fide command will, of course, be lost, but coder 14 is in the proper state to receive subsequent commands. In addition, since counter 9 will only respond to the proper output from filter 6 as produced by mixer 4, in other words, if there is an element lost or a false frequency present detector 7 and integrator 8 will not respond to this erroneous element and, therefore, counter 9 will not be advanced, thus, providing immunity to changes in code element frequencies due to interferring signals or other events. However, counter 9 will count any bona fide element that appears during the time interval 2ET interval is controlled by timer 11. This aids in immunity to interferring signals and the operation of the correlator. Further, if it is suspected that coder 14 has fallen behind its proper state the transmitter can be requested to send a sequence of do nothing pulses (it might be well to reserve one symbol for this command) until coder 14 has caught up to its proper state.

While I have described above the principles of my invention in connection with specific apparatus, it is to be clearly understood that this description is made only by way of example and not as a limitation to the scope of my invention as set forth in the objects thereof and in the accompanying claims.

I claim:

1. A state variant correlator comprising:
   a source of code signal including a plurality of code sequences each having E-elements, where E is an integer greater than one, each of said elements being represented by one of a first plurality of different frequencies according to a given code;
   first means to generate a code identical to said given code;
   second means to generate a second plurality of different frequencies;
   third means to generate timing pulses defining a given time interval between adjacent ones of said timing pulses;
   first counter means coupled to said third means responsive to said timing pulses to produce N-code symbols, where N is an integer greater than one;
   second counter means to count said E-elements of each of said first sequences;
   fourth means coupled to said first and second counter means and said first means responsive to a full count of said second counter means to change the state of said first means and to read-out the state of said first counter means to produce an output signal for said correlator;
   fifth means coupled to said first means, said first and second counter means and said second means responsive to the state of said first means and said first and second counter means to select the output frequencies of said second means from said second plurality of frequencies to provide second sequences of frequencies, each of said frequencies of each of said second sequences being in a predetermined frequency relation with the frequencies representing the corresponding one of said E-elements of each of said first sequences; and
   sixth means coupled to said source, said second means and said second counter means to detect each of said E-elements of each of said first sequences and to activate said second counter means with said detected E-elements.

2. A correlator according to claim 1, wherein said given code is a pseudo-random code.

3. A correlator according to claim 1, wherein said second plurality of different frequencies are different than said first plurality of different frequencies, and
said predetermined frequency relation is a given frequency difference.

4. A correlator according to claim 1, wherein said third means is coupled to said fourth means responsive to said full count of said second counter means occurring before the end of one of said given time intervals to advance the start of the succeeding one of said given time intervals.

5. A correlator according to claim 1, wherein said second counter means includes
   Y-bistable devices where Y is an integer greater than one; and
said fourth means includes
   gate means coupled to the 1 output of each of said Y-devices to produce a first signal to change the state of said first means and to enable the production of said output signal.

6. A correlator according to claim 1, wherein said first counter means includes
   X-bistable devices, where X is an integer greater than one; and
said fourth means includes one-out-of-N matrix means coupled to the 1 and 0 outputs of each of said X-devices, and gate means coupled to said matrix means responsive to said full count to produce said output signal corresponding to one of the N possible states of said X-devices.

7. A correlator according to claim 1, wherein
said first means includes
M-bistable devices, where M is an integer greater than one;
said first counter means includes
X-bistable devices, where X is an integer greater than one;
said second counter means includes
Y-bistable devices, where Y is an integer greater than one; and
said fifth means includes
one-out-of-E matrix means coupled to the 1 and 0 outputs of each of said Y devices, and
logic circuit means coupled to said matrix means, the 1 output of each of said M-devices and the 1 output of each of said X-devices to produce a second signal for application to said second means to select said output frequencies of said second means.

8. A correlator according to claim 1, wherein
said sixth means includes
mixer means coupled to said source and said second means,
filter means coupled to said mixer means responsive to said predetermined frequency relation, and
detector means coupled to said filter means to detect each of said E-elements and to activate said second counter means.

9. A correlator according to claim 8, wherein
said detector means includes
an integrate and dump circuit to activate said second counter means.

10. A correlator according to claim 1, wherein
said first means includes
M-bistable devices, where M is an integer greater than one;
said first counter means includes
X-bistable devices, where X is an integer greater than one;
said second counter means includes
Y-bistable devices, where Y is an integer greater than one;
said fourth means includes
first gate means coupled to the 1 output of each of said Y-devices to produce a first signal to change the state of said first means,
one-out-of-N matrix means coupled to the 1 and 0 outputs of each of said X-devices, and
second gate means coupled to said one-out-of-N matrix means and said first gate means responsive to said first signal to produce said output signal corresponding to one of the N possible states of said X-devices;
said fifth means includes
one-out-of-E matrix means coupled to the 1 and 0 outputs of each of said Y-devices, and
logic circuit means coupled to said one-out-of-E matrix means, the 1 output of each of said M-devices and the 1 output of each of said X-devices to produce a second signal for application to said second means to select said output frequencies of said second means; and
said sixth means includes
mixer means coupled to said source and said second means,
filter means coupled to said mixer means responsive to said predetermined frequency relation, and
detector means coupled to said filter means to detect each of said E-elements and to activate said second counter means.

* * * * *